United States Patent [19]

O'Connor et al.

[11] Patent Number: 5,227,803
[45] Date of Patent: Jul. 13, 1993

[54] TRANSPONDER LOCATION AND TRACKING SYSTEM AND METHOD

[75] Inventors: Roger J. O'Connor, Garden Grove; Peter D. Shloss, Long Beach; Michael Y. Nishida, Cerritos, all of Calif.

[73] Assignee: Hughes Aircraft Company, Los Angeles, Calif.

[21] Appl. No.: 918,734

[22] Filed: Jul. 22, 1992

[51] Int. Cl.⁵ ............................................. G01S 5/04
[52] U.S. Cl. .................................. 342/442; 342/456; 342/51; 342/156
[58] Field of Search .................. 342/424, 442, 456, 51, 342/156

[56] References Cited

U.S. PATENT DOCUMENTS 3,914,762 10/1975 Klensch.
4,123,754 10/1978 Armstrong.
4,303,904 12/1981 Chasek.

Primary Examiner—Theodore M. Blum
Attorney, Agent, or Firm—Wanda K. Denson-Low

[57] ABSTRACT

A transponder location and tracking system having a phased array antenna mounted at a toll collection station includes a plurality of antenna array elements for receiving a signal from a transponder mounted on a vehicle and for providing a plurality of antenna element electrical signals. A plurality of phase detectors are provided for comparing the phase of the electrical signals to provide a plurality of phase difference signals. A plurality of angle-of-arrival calculation processors is provided for converting the phase difference signals to spatial signals to define the angles-of-arrival of the vehicle transponder signal. A position calculation processor is included for providing an output signal representative of the location of the vehicle in response to the defined angles-of-arrival. In a preferred embodiment, the transponder location and tracking system includes a plurality of receiver processing devices for amplifying and filtering the electrical signals from each antenna element. The phase detectors then compare the phase of the electrical signals to a reference element signal. Each phase detector provides a digital representation of the phase difference signals. The spatial signals represent the angle-of-arrival of the vehicle transponder signal. The position calculation processor operates on the spatial signal to determine the vehicle transponder position. A tracking mechanism is provided to plot the location of a moving vehicle along the roadway.

18 Claims, 3 Drawing Sheets

TRANSPONDER LOCATION AND TRACKING SYSTEM AND METHOD

BACKGROUND OF THE INVENTION

1. Field of the Invention

The present invention relates to tracking systems. More specifically, the present invention relates to methods and apparatus for locating and tracking communication transponders using phase interferometer techniques.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

2. Description of the Related Art

Automated toll collection systems are known in the art. Typically, these systems comprise a reader transponder and at least one vehicle transponder. The reader transponder includes either laneside, overhead or in-pavement antennas in each traffic lane. The reader transponder senses the presence of the vehicle transponder by employing a vehicle sensor or by transmitting an RF signal to which the vehicle transponder responds with an identification message. In conventional automated toll collection systems, toll booth barriers are utilized to route vehicles one at a time through an electronic toll collection area. Thus, only one vehicle transponder is within the range of the antenna pattern. The toll is then collected electronically from the vehicle in the designated area.

Unfortunately, existing electronic toll collection and tracking systems do not identify and locate all vehicles on a roadway unless the vehicle includes a transponder. If a particular vehicle is not equipped with a transponder, it will not be detected by the reader transponder. Thus, if tolls are only collected from vehicles via an electronic link, the absence of a transponder enables a vehicle to utilize the roadway without charge. Therefore, enforcement of toll collection from vehicles using the roadway is a major problem in electronic toll collection systems of the prior art.

In the past, the problem of enforcement of toll collection from vehicles using the roadway has been addressed in the following manner. A communication link is established between the reader transponder and a particular vehicle transponder by accurately adjusting the antenna pattern of the reader transponder to illuminate and to electronically collect the toll from a single vehicle transponder. These requirements necessitate an antenna to be positioned in each traffic lane of the roadway. Each of the antennas are either connected to a dedicated roadside reader transponder or are multiplexed to a single reader transponder. The systems of the prior art are designed to communicate with only a single vehicle per traffic lane and then only if the lane is equipped with an antenna. Each vehicle must slow down or stop, or remain in a particular traffic lane during the vehicle identification process. These requirements restrict the flow of traffic and tend to increase congestion.

A rudimentary method of enforcement of toll collection from vehicles using the roadway is to design the transponder fitted on each vehicle to be physically observable. A vehicle using the roadway without an observable transponder is cited as a violator. In more sophisticated electronic toll collection system designs, the antenna patterns are used to determine if a particular vehicle is a toll violator. The absence of a transponder response from a vehicle in combination with detection of the vehicle at an established detection location (e.g., for example, video detection) indicates a potential toll violation.

The enforcement performance of the toll collection technique utilizing the antenna patterns is further determined by the ability to electrically isolate the responses of different vehicle transponders from one another. The installation of physical barriers and associated infrastructure to electrically separate vehicles is required to achieve high performance enforcement during the toll collection procedure. Therefore, a conventional electronic toll collection system necessitates one of the following constructions: either (a) a reader transponder antenna must be buried in each lane of the roadway and the vehicle transponders must be mounted on the bumpers of the individual vehicles, or (b) wide lane spacing must be provided for increasing the spacing between vehicles to ensure that overhead antenna patterns can provide the vehicle response separation without ambiguity. Both of these construction alternatives also lead to restrictions on lane changes during the toll collection procedure.

The ability to electrically isolate responses of different vehicle transponders from one another to improve enforcement performance is inversely related to the requirement of ensuring reliable communications between the reader transponder and the vehicle transponder. To improve the reliability of a communication link with a vehicle transponder and thus to increase the probability of toll collection, the antenna radiating power of the reader transponder can be increased. Increasing the antenna radiating power extends the area of coverage of the reader transponder.

Although the reliability of the communication link might be improved, increasing the antenna radiating power of the reader transponder can result in a cross-lane read problem in a high density traffic environment. A cross-lane read problem is characterized by the inability of the reader transponder to determine with which vehicle transponder the communication link has been established. Thus, the vehicle transponder with which the reader transponder is communicating can be erroneously identified. In order to minimize the cross-lane read problem and to isolate vehicle transponder responses from one another, it is necessary to reduce the antenna radiating power of the reader transponder. Unfortunately, this action also reduces the reliability of the communication link between the reader transponder and the vehicle transponder and lowers the toll collection performance level of the electronic toll collection system.

Unfortunately, the above described automated toll collection systems of the prior art do not identify a particular vehicle with respect to the position or location of the vehicle transponder on the roadway. If tolls are electronically collected from vehicles, the absence of a transponder enables a vehicle to utilize the roadway without charge. Clearly, toll collection enforcement of the exemplary automated toll collection systems exhibit poor performance. Thus, the probability of violator identification is low, the infrastructure costs are high since many additional components are required to support the system, and the restrictions on traffic flow are burdensome. Further, the reliability of the system is reduced during high traffic density periods or when vehicles straddle a traffic lane.

Thus, there is a need in the art for improvements in systems that locate and track vehicle transponders associated with automated toll collection systems.

SUMMARY OF THE INVENTION

The need in the art is addressed by the transponder location and tracking system and method of the present invention. The invention includes a phased array antenna mounted at a toll collection station having a plurality of antenna array elements for receiving a signal from a transponder mounted on a vehicle and for providing a plurality of antenna element electrical signals in response thereto. A plurality of phase detectors are provided for comparing the phase of the electrical signals to provide a plurality of phase difference signals. A plurality of angle-of-arrival calculation processors is provided for converting the phase difference signals to spatial signals to define the angles-of-arrival of the vehicle transponder signal. A position calculation processor is included for providing an output signal representative of the location of the vehicle in response to the defined angles-of-arrival.

In a preferred embodiment, the transponder location and tracking system includes a plurality of receiver processing devices for amplifying and filtering the electrical signals from each antenna element. The phase detectors then compare the phase of the electrical signals to a reference element signal. Each phase detector provides a digital representation of the phase difference signals. The spatial signals represent the angle-of-arrival of the vehicle transponder signal. The position calculation processor operates on the spatial signals to determine the vehicle transponder position. A tracking mechanism is provided to plot the location of a moving vehicle along the roadway.

DESCRIPTION OF THE INVENTION

Figure 1:
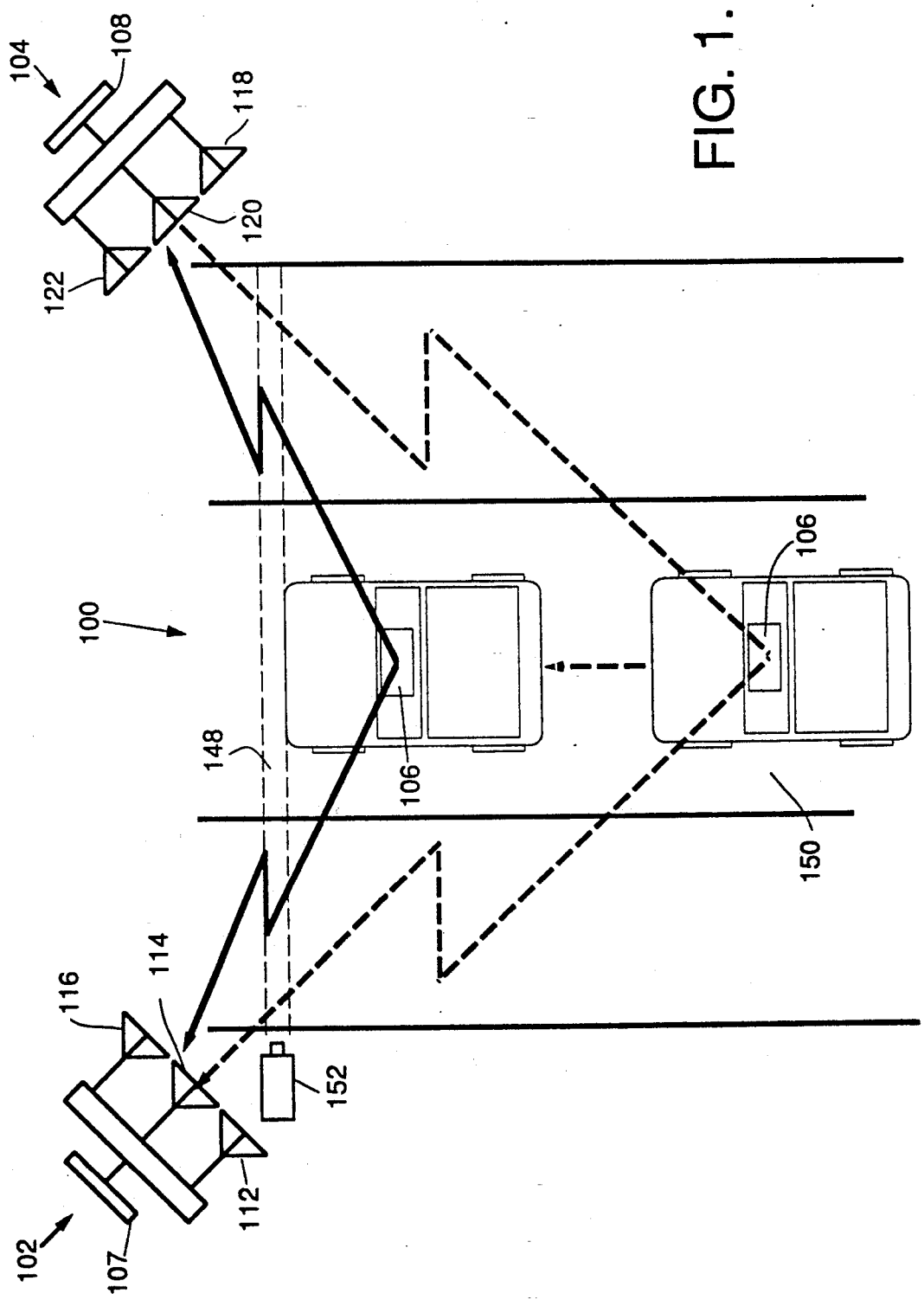
FIG. 1 is a simplified planar view of an illustrative embodiment of the transponder location and tracking system of the present invention showing multiple element antennas of a reader transponder for tracking signals from a vehicle transponder.

The transponder location and tracking system 100 of the present invention is shown in FIG. 1. The transponder location and tracking system 100 is employed in electronic toll road collection enforcement. The system 100 includes a plurality of antenna arrays 102 and 104 mounted at a toll collection station for locating and tracking a vehicle or container equipped with a transponder 106 using phase interferometer techniques. Each antenna array 102 and 104 serves to intercept a signal from the transponder 106 in response to an interrogation signal from one of a plurality of receivers 107 and 108 of a vehicle-to-roadside communications network. The signal may be emitted by the transponder 106 and received by the antenna arrays 102 and 104 or emitted by the antenna arrays 102 and 104 and received by the transponder 106. The construction of a variety of transponders 106 and receivers 107 and 108 are known in the art.

An example of a suitable communications network to be employed with the transponder location and tracking system 100 of the present invention is a Time Division Multiple Access (TDMA) communication network. It is noted that other communication networks are suitable for use with the present invention. The TDMA network incorporates a protocol that simplifies the process of identifying vehicles on a roadway by employing an activation time slot to randomly gain entry to the TDMA network and a message time slot utilized to transfer data between the vehicle transponder 106 and receivers 107 and 108. The receivers 107 and 108 can be roadside or aerial mounted. Each of the vehicle transponders 106 communicating with the receivers 107 and 108 is assigned a specific message time slot during which data is transmitted. The design of this protocol eliminates the error that would otherwise occur if two vehicle transponders simultaneously transmitted data.

Many known antenna designs are suitable for use in the transponder location and tracking system 100 of the present invention. In particular, the phased array antenna is appropriate. In order to measure the wavefront of the transponder signal arriving at the antenna arrays 102 and 104, each phased array includes a plurality of antenna elements. A minimum of two antenna elements is required to ensure proper operation. However, three or more antenna elements provide more accurate results. Therefore, antenna array 102 includes a first set of antenna elements 112, 114 and 116 while antenna array 104 includes a second set of antenna elements 118, 120 and 122 as shown in FIG. 1. The wavefront strikes each antenna array 102 and 104 at an angle which generates a phase difference between the signals on each antenna array element 112, 114, 116, 118, 120 and 122. This phase difference is defined by the angle-of-arrival of the response signal from the vehicle transponder 106. Since each antenna element receives the wavefront signal at slightly different times, the signal timing is different for each antenna element of each array 102 and 104.

As is well known in the art, this time difference in the interception of the wavefront between two antenna elements of the same array can be determined by measuring the phase of the voltage induced therein. The differential phase information allows for a determination of the direction of the wavefront of incident energy from the transponder 106. The performance of the antenna elements can be optimized by varying the number and spacing of the antenna elements in each array 102 and 104. Use of two or more antenna arrays establishes a corresponding number of angles-of-arrival which define a corresponding number of paths as described hereinbelow. The point at which the angles-of-arrival intersect describes the location of the vehicle transponder 106 on the roadway. The number of antenna arrays employed is determined by a practical criteria such as a cost-performance tradeoff.

Figure 2:
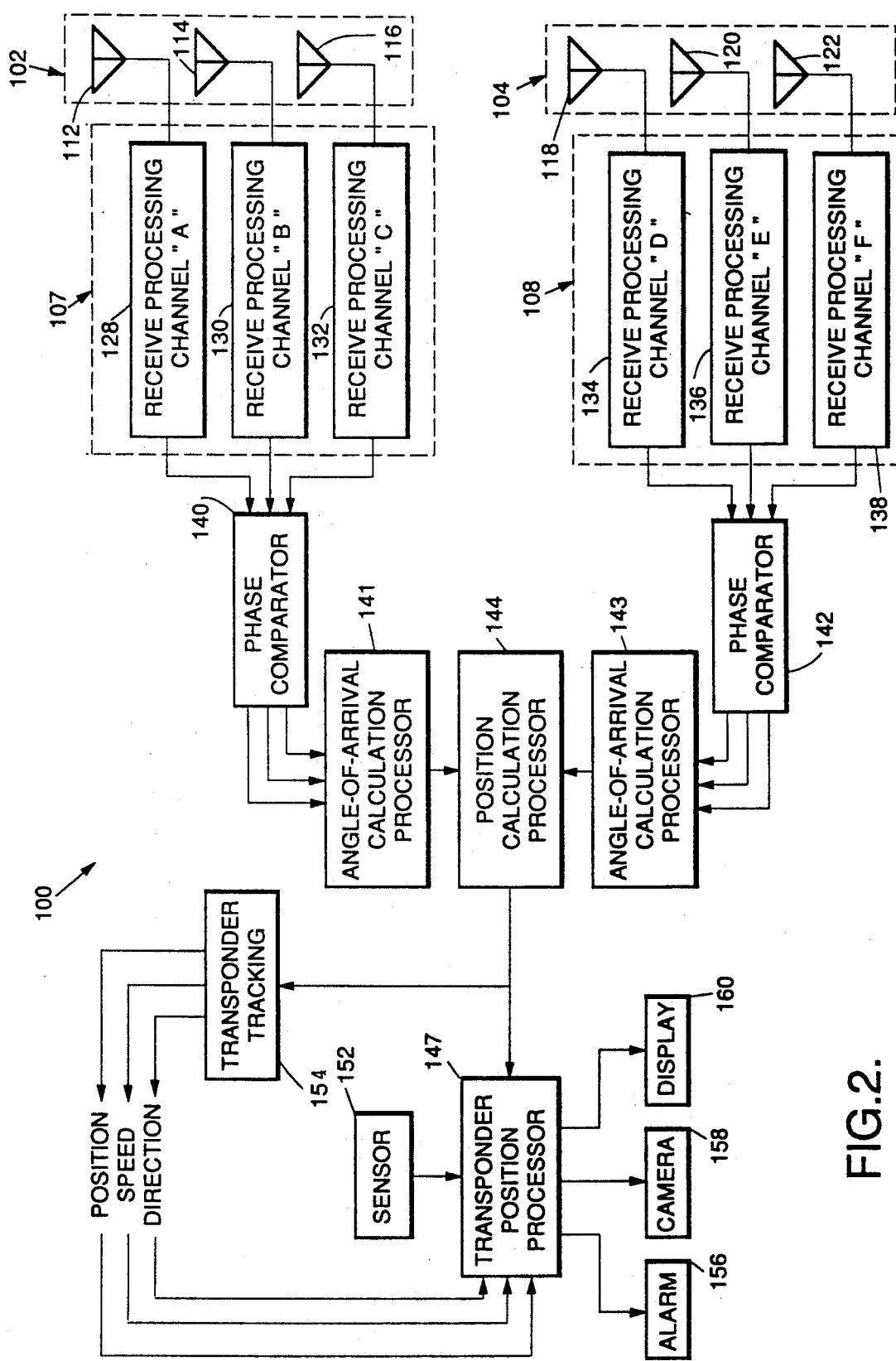
FIG. 2 is a block diagram of the transponder location and tracking system of FIG. 1 showing a position calculation processor which determines the location of the vehicle transponder based upon the angles-of-arrival of the signals received from the multiple element antennas.

The output signal of each antenna array 102 and 104 includes a plurality of analog signals (e.g., for example RF signals) that is equal in number to the number of antenna elements (112, 114, 116 or 118, 120, 122) in the respective antenna array. Each antenna array 102 and 104 transmits the respective analog signals to the corresponding receiver 107 and 108 as shown in FIG. 2. Therefore, the analog signals generated by the antenna elements 112, 114 and 116 are transmitted for processing to receiver 107 and the analog signals generated by the antenna elements 118, 120 and 122 are transmitted for processing to receiver 108. Each of the receivers 107 and 108 include a plurality of processing channels. In the example illustrated in FIG. 2, each receiver 107 and 108 includes three processing channels. Therefore, receiver 107 includes channels A, B and C represented by the numerals 128, 130 and 132. Likewise, receiver 108 includes channels D, E and F represented by the numerals 134, 136 and 138.

Each of the processing channels 128, 130, 132, 134, 136 and 138 serve to amplify and filter the analog signals received from each antenna array 102 and 104. The number of processing channels 128, 130, 132, 134, 136 and 138 is equal to the number of antenna array elements 112, 114, 116, 118, 120 and 122. Thus, the function of each processing channel is to amplify and filter the analog signal received from the corresponding antenna element to remove interference and extraneous signals. Examples of interference and extraneous signals include other transmitted signals operating in the same frequency band and noise.

The amplifying and filtering of each analog signal by the corresponding processing channel 128, 130, 132, 134, 136 and 138 further serves to improve the signal-to-noise ratio and to increase the amplitude of the analog signal. The amplification of the analog signal is necessary to ensure proper operation of subsequent processing stages within the transponder location and tracking system 100. The signal transmitted from each processing channel is a filtered, amplified analog signal with an improved signal-to-noise ratio. An example of structure that can perform the function of each of the receivers 107 and 108 is a multi-channel superheterodyne receiver.

The filtered, amplified analog signal from each of the processing channels 128, 130, 132, 134, 136 and 138 is directed to a corresponding phase comparator 140 and 142 as shown in FIG. 2. Thus, the analog signals from the processing channels 128, 130 and 132 are directed to phase comparator 140 and the analog signals from the processing channels 134, 136 and 138 are directed to phase comparator 142. The function of each phase comparator 140 and 142 is to compare the phase angle between the channels of the corresponding receivers 107 and 108. In particular, the phase comparator 140 compares the phase angle between the analog signals from processing channels 128, 130 and 132 and phase comparator 142 compares the phase angle between the analog signals from processing channels 134, 136 and 138, respectively.

The phase angle difference between two channels of the same receiver 107 or 108 is then used to calculate the angle-of-arrival of the wavefront between the two antenna elements associated with the two channels. Since the phase angle difference between the analog signals of the two channels is relative, an absolute phase reference is not required. One of the processing channels of each receiver 107 and 108 is selected as a reference processing channel. Thus, each of the analog signals of the remaining channels is compared to the analog signal of the reference channel in the corresponding receiver 107 or 108. In the three element antenna arrays 102 and 104 shown in FIGS. 1 and 2, the phase difference signals of each of the phase comparators 140 and 142 are determined as follows. If channel "A" at 128 is selected as the phase reference, the phase difference signals from phase comparator 140 include the difference between the phase of the analog signals from channel "A" at 128 and channel "B" at 130 and the difference between the phase of the analog signals from channel "A" at 128 and channel "C" at 132.

Likewise, if channel "D" at 134 is selected as the phase reference, the phase difference signals from the phase comparator 142 include the difference between the phase of the analog signals from channel "D" at 134 and channel "E" at 136 and the difference between the phase of the analog signals from channel "D" at 134 and channel "F" at 138. The phase difference signals determined by the phase comparators 140 and 142 can be an analog or digital representation of the electrical phase difference between the signal wavefront arriving at the different antenna elements of the respective antenna arrays 102 and 104. An example of structure that can perform the function of the phase comparators 140 and 142 is a double balance mixer. If the phase difference signals are an analog representation of the electrical phase difference between the signal wavefront arriving at the different antenna elements, the analog representation is subjected to an analog-to-digital (A/D) conversion. The A/D conversion provides a digital representation of the electrical phase difference between the signal wavefront arriving at the different antenna elements.

The digital representation of the electrical phase difference plus the digital representation of data describing the type of antenna element employed is utilized to perform a computation in a pair of known angle-of-arrival calculation processors 141 and 143. The purpose of the computation is to convert the digital representation of the electrical phase difference to a digital spatial phase measurement. The digital spatial phase measurement is then utilized for determining, e.g., defining the angle-of-arrival of the vehicle transponder signal. The computation to provide the digital spatial phase measurement is performed by an algorithm known in the art as the phase interferometer calculation and is represented by the following expression $$\Theta = Arc\ Sin\ (\Phi \tau / 2\pi L) \qquad [1]$$

where $\Theta$ is the spatial angle-of-arrival measured from boresight, $\Phi$ is the electrical phase difference, $\tau$ is the wavelength of the frequency of the wavefront, and L is the separation distance between the antenna elements 112, 114, 116, 118, 120 and 122. The use of widely spaced (e.g., multiple half-wavelengths) antenna elements can increase the system sensitivity but can result in phase ambiguities. Thus, the relationship between the electrical phase difference between the signal wavefront arriving at the different antenna elements and the value of the spatial phase measurement is beneficially utilized. Each of the phase comparators 140 and 142 provides an input to the corresponding angle-of-arrival calculation processor 141 and 143, respectively, when the digital spatial phase value is the output signal.

The digital spatial phase value provided by each angle-of-arrival calculation processor 141 and 143, respectively, is transmitted to a position calculation processor 144 as shown in FIG. 2. It is well known in the art that a line constructed orthogonal to the signal wavefront arriving at an antenna array lies in the direction of the vehicle transponder 106 propagating the signal wavefront. When the signal wavefront is intercepted by the plurality of antenna arrays 102 and 104, a corresponding number of lines orthogonal to the signal wavefronts can be constructed. The intersection of the plurality of lines in space describes the location of the vehicle transponder 106. Each of the digital spatial phase values received by the position calculation processor 144 represents a line in space between the vehicle transponder 106 and the respective antenna arrays 102 and 104. In the example shown in FIG. 2, the phase comparisons provided by phase comparator 140 are utilized by angle-of-arrival calculation processor 141 to provide a first digital spatial phase value representing one line and the phase comparisons provided by phase comparator 142 are utilized by angle-of-arrival calculation processor 143 to provide a second digital spatial phase value representing a second line.

Figure 3:
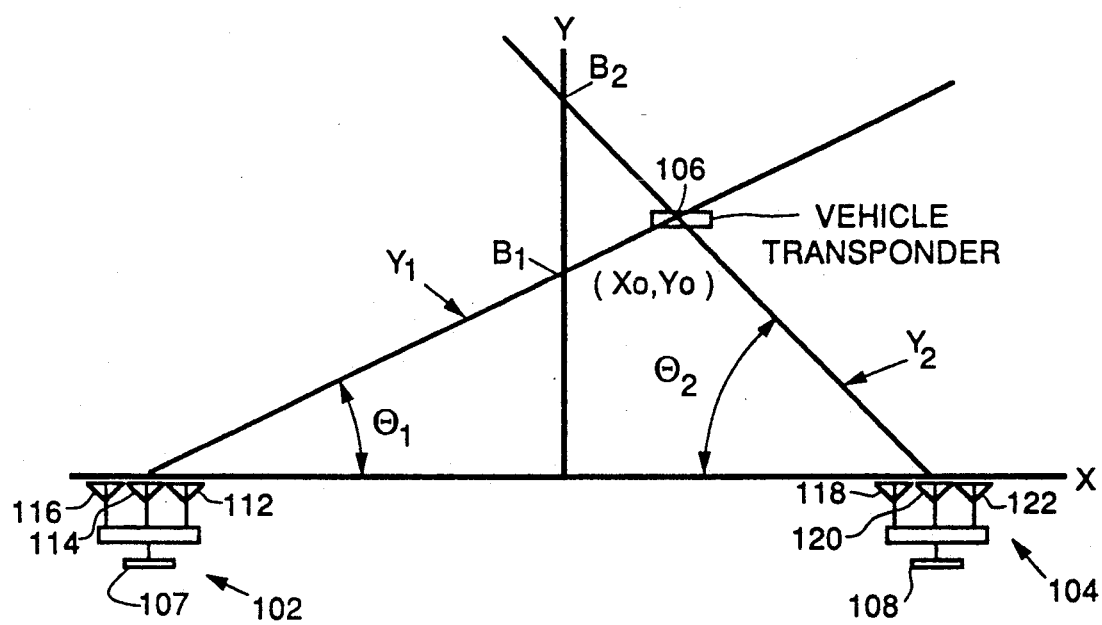
FIG. 3 is a graph showing a pair of multi-element antenna arrays and the construction utilized to locate the position of the vehicle transponder of FIG. 1.

The position calculation processor 144 can be a microprocessor and serves to compute the intersection of the two lines in space. Any mathematical formula or algorithm known in the art for calculating the intersection of two straight lines is suitable for the present application. An example of a position location equation for determining the intersection of two straight lines will now be described with reference to FIG. 3. A cartesian coordinate system having the normal X-axis and Y-axis arrangement is shown in FIG. 3. Further, the two antenna arrays 102 and 104 are assumed to lie in the horizontal X-axis plane with antenna array 102 appearing on the negative X-axis and the antenna array 104 appearing on the positive X-axis. It is assumed that the first straight line $Y_1$ extends from the vehicle transponder 106 to the antenna array 102 forming a positive acute interior angle $\Theta_1$ with the X-axis. Likewise, it is assumed that the second straight line $Y_2$ also extends from the transponder 106 to the antenna array 104 forming a negative acute interior angle $\Theta_2$ with the X-axis.

The first straight line $Y_1$ extending between the transponder 106 and the antenna array 102 is defined by the equation $$Y_1 = A_1 X + B_1 \quad [2]$$

where $A_1$ is equal to $\tan \Theta_1$, the slope of $\Theta_1$, and $B_1$ is equal to the intercept of the first straight line $Y_1$ with the vertical Y-axis. Likewise, the second straight line $Y_2$ extending between the transponder 106 and the antenna array 104 is defined by the equation $$Y_2 = -A_2 X + B_2 \quad [3]$$

where $A_2$ is equal to $\tan \Theta_2$, the slope of $\Theta_2$, and $B_2$ is equal to the intercept of the second straight line $Y_2$ with the vertical Y-axis. The angles $\Theta_1$ and $\Theta_2$ represent the first and second angles-of-arrival computed by the phase interferometer calculation of equation [1] within the respective angle-of-arrival calculation processor 141 and 143. The intersection of the two straight lines occurs at the location of the vehicle transponder 106 having the coordinates $(X_0, Y_0)$ where $$X_0 = [(B_2 - B_1)/(\tan \Theta_1 + \tan \Theta_2)] \quad (4)$$

and $$Y_0 = [(B_2 - B_1) \tan \Theta_1 /(\tan \Theta_1 + \tan \Theta_2)] + B_2 \quad [5]$$

The position calculation processor 144 generates a position output signal appearing on a line represented by numeral 146 as shown in FIG. 2. The position output signal is a digital signal that represents the location of the transponder 106 on the roadway using a suitable coordinate system known in the art. Utilizing the position output signal generated from a single transponder response signal, the position of the transponder 106 can be fixed. This information is valuable in ascertaining the location of a stationary transponder mounted on or contained within, for example a parked vehicle, a cargo container or a railroad car stored in a compound, shipyard or railroad yard. The position output signal is then transmitted to a transponder position processor device 147 that can be utilized in electronically collecting a toll from a vehicle or in locating inventory in a warehouse or in processing cargo transmitted by ship or rail.

The location of a non-stationary transponder 106 can be determined with sequential measurements of the transponder. As the vehicle transponder 106 moves along a roadway, a vehicle "track" can be established. Use of the data associated with the vehicle track enables an estimate to be calculated as to when the vehicle transponder 106 will cross a designated detection line 148 positioned across a traffic lane 150 shown in FIG. 1. The existence of vehicle tracking data in combination with a sensor device 152 positioned along the detection line 148 ensures that the vehicle is equipped With a transponder 106 and is authorized to use the roadway. The sensor device 152 can be, for example, an induction loop, a video loop or a radar detector.

A vehicle "track" is significant since not all vehicles using the roadway are equipped with a transponder. Only transponder equipped vehicles are authorized to use the roadway and these vehicles are billed electronically for the roadway usage. Vehicles not equipped with a transponder cannot be billed electronically and could, in the absence of the present invention, use the roadway without charge. In the absence of tracking data for a vehicle that is sensed when crossing the detection line 148 by the sensor device 152, action is taken to identify the vehicle. The action can be in the form of photographing the vehicle license plate or energizing an audible or visual alarm to warn a toll collection operator.

Generation of a vehicle "track" for use in electronic toll collection applications is provided in the following manner. The antenna arrays 102 and 104 receive a series of response signals from the same vehicle transponder 106 as it moves along the roadway. The response signals are processed as described above. A digital position output signal for each processed response signal is transmitted to a transponder tracking device 154 shown in FIG. 2. The tracking device 154 can be a microprocessor which stores a multiplicity of the position output signals as sequential measurements of the transponder 106 are made. Each sequential measurement differs from a preceding or subsequent measurement in position and time. The difference in position and time of the sequential position output signals enable the calculation of the speed and direction of the relevant vehicle transponder 106.

Thus, the "track" of the transponder 106 and thus the vehicle is established by use of the following equation $$V = (\delta P / \delta T) \quad [6]$$

where V is a vector representing the velocity (e.g., magnitude and direction) of the transponder 106, δT is the time difference between the transmissions of the vehicle transponder 106, and δP is the change in position of the transponder 106 on a (e.g., for example X-Y) coordinate system. The position parameter can be determined by a single position output signal provided by the interception of a single receive signal from the transponder 106. Sequential interceptions of the transponder response signals provide the tracking data (e.g., position, speed and direction) which is diagrammatically illustrated extending from the tracking device 154 to the transponder position processor device 147 shown in FIG. 2. The transponder position processor device 147 utilizes the tracking data to provide an estimate of when the vehicle transponder 106 and thus the vehicle will cross the detection line 148 in traffic lane 150.

The transponder location and tracking system 100 serves to identify and track the location or spatial position of all vehicle transponders 106 as they move along the roadway. In operation, vehicles having a transponder 106 mounted thereto enter the capture area of the electronic toll collection system. As the vehicle transponders 106 move along the roadway, the protocol employed by the TDMA communication network is utilized to assign individual transponders to specific transmission times and to electronically collect tolls from the vehicles. When a vehicle transponder 106 transmits, the response signal is received by the multiple antenna arrays 102 and 104 and the angle-of-arrival of the signal is measured by the transponder location and tracking system 100. The antenna arrays 102 and 104 can be spaced across the roadway as shown in FIG. 1.

The angle-of-arrival measurements from the multiple antenna arrays 102 and 104 are amplified and filtered in the receivers 107 and 108 and combined in the phase comparators 140 and 142. The angle-of-arrival calculation processors 141 and 143 are utilized to generate the angles-of-arrival of the received transponder signal. Thereafter, the position calculation processor 144 is employed to generate the position output signal to determine the location of the vehicle transponders 106. At periodic intervals, the TDMA network protocol activates an individual transponder response signal. The antenna arrays 102 and 104 are again utilized to intercept the signal and the transponder location and tracking system 100 determines the location of the transponder 106 once again.

The position measurements (e.g., position output signals) provided by the position calculation processor 144 are used to form the vehicle "track" to estimate the speed and direction of the vehicle transponder 106. The tracking is continued until the vehicle transponder 106 is detected by the sensor device 152. The vehicle tracking data and the estimated velocity (e.g., speed and direction) are used to predict when and where the vehicle transponder 106 will cross the detection line 148 on the roadway. The tracking data in combination with a sensor signal indicates that the vehicle is authorized to use the roadway. If a vehicle is detected at the detection line 148 by the sensor device 152 and corresponding tracking data is not available to the transponder position processor device 147 from the tracking device 154, it is assumed that the vehicle is not authorized to use the roadway. Under these conditions, corrective action is instituted by the transponder position processor device 147 by activating an audio or visual alarm 156, operating a camera 158 to photograph the vehicle license plate, or generating an image of the vehicle on a display monitor 160 as shown in FIG. 2.

The present invention exhibits advantages over prior art automated toll collection and tracking systems. Those advantages include the capability of electronically collecting tolls from a vehicle transponder 106 on the open roadway, at prevailing speeds and with no restrictions on vehicle lane changes. Further, the use of physical toll barriers are not required. Thus, it is not necessary to interfere with the flow of traffic on the roadway. Further, the transponder location and tracking system 100 provides a viable enforcement technique that is compatible with the electronic toll collection process performed by the TDMA network.

Another significant advantage of the present invention is that a cross-lane read problem does not exist. Cross-lane read problems do not exist because the response signal transmissions of the vehicle transponders 106 are separated in time, not space, by the TDMA network. By measuring a first signal angle-of-arrival, the position of the vehicle transponder 106 is determined. The measurement of a second signal angle-of-arrival likewise determines the position of the transponder 106. The two measurements of the first and second angles of arrival are separated geometrically. Conversely, antenna patterns utilized in the prior art rely on free space path loss to determine the position of the transponder. The distinction is that the first and second angles-of-arrival determined by the present invention are different points on the spatial line represented by the position output signal provided by the position calculation processor 144. The antenna patterns used in the prior art identify only an area in space in which the transponder is located and not a unique address (e.g., the points on a spatial line).

Thus, the present invention has been described herein with reference to a particular embodiment for a particular application. Those having ordinary skill in the art and access to the present teachings will recognize additional modifications, applications and embodiments within the scope thereof. Although the detailed description is directed to electronic toll collection, the present invention is equally applicable to other embodiments in which the transponder 106 is enclosed within a cargo container located in a warehouse or shipyard or a railroad car parked in a switching yard.

It is therefore intended by the appended claims to cover any and all such modifications, applications and embodiments within the scope of the present invention.

Accordingly,

What is claimed is:

1. A vehicle location system for toll collection comprising:

phased array antenna means mounted at a toll collection station having a plurality of antenna array elements for receiving a signal from a transponder mounted on a vehicle and for providing a plurality of antenna element electrical signals in response thereto;

phase detector means for comparing the phase of said electrical signals to provide a plurality of phase difference signals in response thereto;

angle-of-arrival calculation means for converting the phase difference signals to spatial signals to define the angles-of-arrival of said vehicle transponder signal; and position calculation means for providing an output signal representative of the location of said vehicle in response to said defined angles-of-arrival.

2. The vehicle location system of claim 1 wherein said phased array antenna means comprises a plurality of antenna arrays.

3. The vehicle location system of claim 1 wherein said phase detector means comprises a plurality of phase comparators.

4. The vehicle location system of claim 1 wherein said phase detector means comprises a double balance mixer.

5. The vehicle location system of claim 1 wherein said position calculation means comprises a microprocessor.

6. The vehicle location system of claim 1 further including means for amplifying and filtering said antenna element electrical signals.

7. The vehicle location system of claim 6 wherein said amplifying and filtering means comprises a receiver processing device.

8. The vehicle location system of claim 7 wherein said receiver processing device includes a multi-channel superheterodyne receiver.

9. A vehicle location and tracking system for toll collection comprising:

phased array antenna means mounted at a toll collection station having a plurality of antenna array elements for receiving a signal from a transponder mounted on a vehicle and for providing a plurality of antenna element electrical signals in response thereto;

phase detector means for comparing the phase of said electrical signals to provide a plurality of phase difference signals in response thereto;

angle-of-arrival calculation means for converting the phase difference signals to spatial signals to define the angles-of-arrival of said vehicle transponder signal;

position calculation means for providing an output signal representative of the location of said vehicle in response to said defined angles-of-arrival; and means for receiving and storing a plurality of said output signals and for providing a plurality of position parameter values to track the location of said vehicle.

10. The vehicle location and tracking system of claim 9 wherein said means for receiving and storing said output signals and for providing said position parameter values includes a microprocessor controlled tracking circuit.

11. The vehicle location and tracking system of claim 9 wherein said position parameter values include the parameters of speed and direction.

12. The vehicle location and tracking system of claim 9 further including a transponder position processing device for utilizing said output signals and said position parameter values to estimate the position of said vehicle.

13. The vehicle location and tracking system of claim 9 further including a sensor device for indicating the present of said vehicle.

14. The vehicle location and tracking system of claim 9 further including an annunciator device.

15. A method for locating and tracking a vehicle, said method comprising the steps of:

receiving a signal from a transponder mounted on a vehicle with a plurality of antenna array elements of a phased array antenna mounted at a toll collection station;

providing a plurality of antenna element electrical signals with said antenna array elements in response to said vehicle transponder signal;

amplifying and filtering said antenna element electrical signals in a receiver processing device;

comparing the phase of said amplified and filtered electrical signals to provide a plurality of phase difference signals;

converting said phase difference signals to spatial signals to define the angles-of-arrival of said vehicle transponder signal; and providing an output signal representative of the location of said vehicle in response to said defined angles-of-arrival.

16. The method of claim 15 further including the step of receiving and storing a plurality of said output signals and providing a plurality of position parameter values to track the location of said vehicle.

17. The method of claim 15 further including the step of detecting the presence of said vehicle with a sensor device.

18. The method of claim 15 further including the step of estimating the position of said vehicle with a transponder position processing device by utilizing said output signals and said position parameter values.

* * * * *